United States Patent [19]

Randolph, Jr.

[11] 3,992,933

[45] Nov. 23, 1976

[54] ELECTROMECHANICAL MOMENT-INDEPENDENT DEFLECTION SENSOR

[76] Inventor: George J. Randolph, Jr., 803 SE. Kane, Roseburg, Oreg. 97470

[22] Filed: Aug. 21, 1975

[21] Appl. No.: 606,765

[52] U.S. Cl. .............................................. 73/141 A
[51] Int. Cl.² ......................................... G01L 5/00
[58] Field of Search ........................... 73/141 A, 139

[56] References Cited
UNITED STATES PATENTS

| | | | |
|---|---|---|---|
| 2,213,982 | 9/1940 | Frey et al. | 73/88.5 R |
| 2,319,299 | 5/1943 | Converse | 73/141 A |
| 3,832,898 | 9/1974 | Randolph | 73/141 A |

*Primary Examiner*—James J. Gill
*Assistant Examiner*—Anthony V. Ciarlante
*Attorney, Agent, or Firm*—Kolisch, Hartwell, Dickinson & Stuart

[57] ABSTRACT

Apparatus for measuring the load applied in a selected plane to a cantilever-type beam, without regard to the exact point of load application. The apparatus, in one embodiment, features a pair of elongated bar-like devices mounted at points spaced along such beam, and projecting toward and overlapping each other—each device being constructed, under all conditions of beam bending, to remain tangent to a line parallel to the beam's neutral axis adjacent the point where the device is attached. The spacing which develops at a selected region between the overlapping portions of these devices with loaded beam bending is directly indicative of the amount of load on the beam. This indication does not depend upon how far from the beam's fixed end the load is applied, so long as the load is applied no further inwardly on the beam than the mounting point for the outermost bar-like device.

Other embodiments feature interconnected or interengaged bar-like devices equipped with electromechanical deflection sensors. These devices tend to deflect with beam bending, and such deflection is directly indicative of beam loading.

6 Claims, 7 Drawing Figures

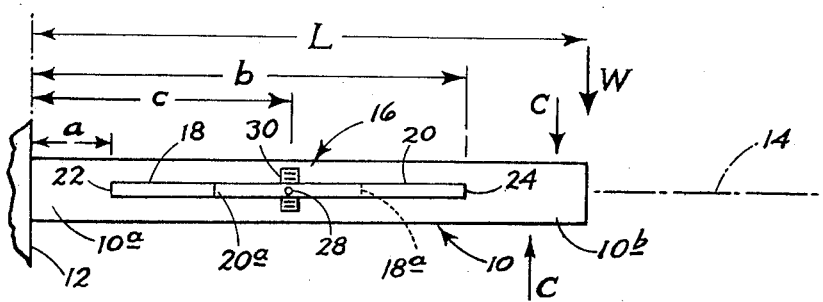
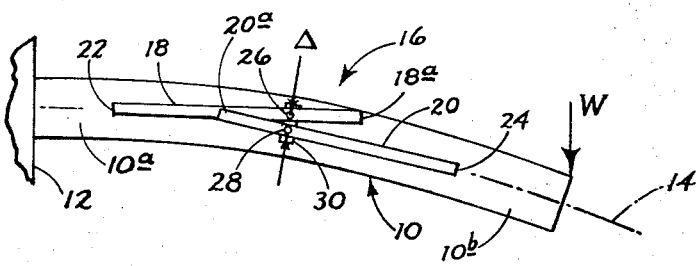
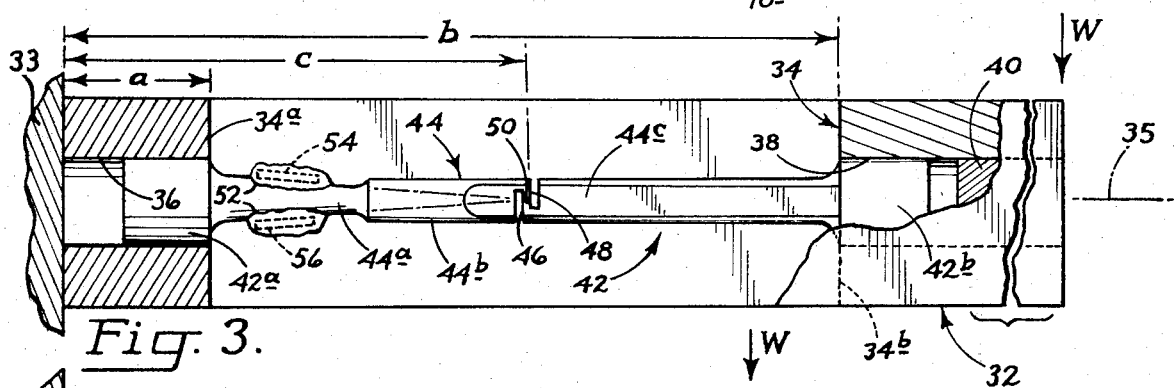
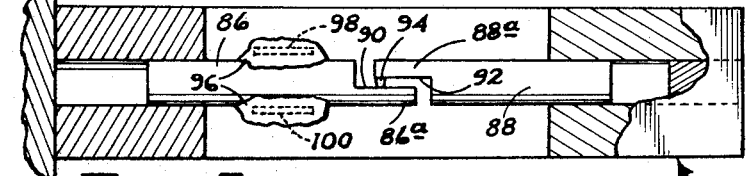
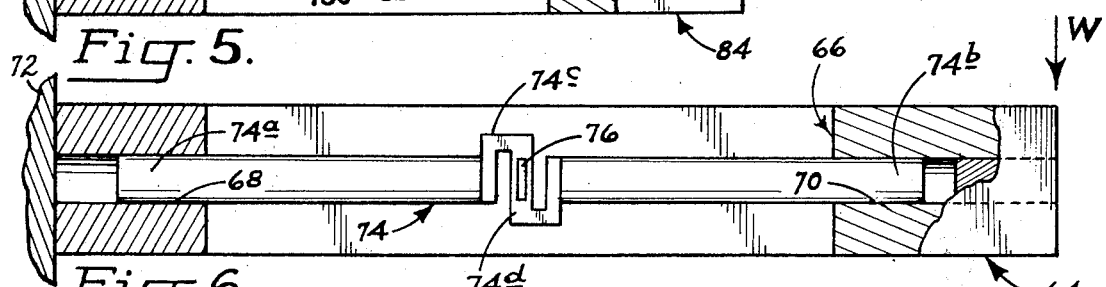
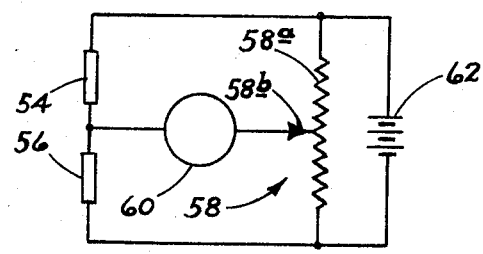
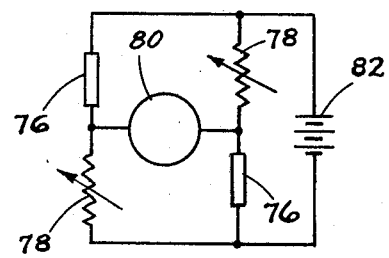

ELECTROMECHANICAL MOMENT-INDEPENDENT DEFLECTION SENSOR

BACKGROUND AND SUMMARY OF THE INVENTION

This invention pertains to apparatus for measuring a load applied to a cantilever-type beam. In particular, it relates to such apparatus in which this kind of measurment may be made extremely accurately, and without regard to the exact point along such a beam where a load is applied.

There are various applications in which cantilever-type beams are subjected to loads whose levels are desired to be monitored. Such beams often form part of, or are operatively associated with, other equipment wherein the level of loading is desired to be followed. An example would be the handle of a torque wrench. In the past, strain gauges and like devices, or other kinds of load-measuring means, have been suitably secured to such beams for the purpose of deriving the desired load information. However, a consideration which has substantially always been of concern heretofore, is knowledge with respect to the exact point along a beam where a load is applied. In other words, final calculation, or indication, of the desired load information has depended upon accurate knowledge of the point of load application.

A general object of the present invention is to provide load information of the type outlined, which is capable accurately of performing this function, without the requirement for there being any knowledge regarding the exact point along a beam where a load is applied.

Another object of the invention is to provide such apparatus which can be incorporated extremely simply in a wide variety of cantilever-type beam devices.

Still another object is to provide such apparatus which is extremely simple in construction, and economical to manufacture.

The present invention is based on the concept that if a pair of devices, such as elongated stiff fingers, are mounted at a pair of points spaced along a cantilever-type beam, with dispositions tangent to lines parallel to the beam's neutral axis adjacent the points where the devices are attached, then, when the beam bends under substantially right-angle loading, overlapping extensions of these devices will separate, or tend to separate, in a manner directly relatable to the amount of the load producing such bending. The only restriction as to where a load must be applied for this relationship to hold true, is that the load must be applied no further inwardly along the beam than the point of attachment of the outermost device.

In one embodiment of the invention the proposed devices comprise elongated, straight, stiff fingers attached as described above — the separation between which, at a selected place between their mountings is measured in a visual manner. In another embodiment, the devices comprise portions of a unitary elongated deflection sensor having a central "flexure" — a region weakened to have a relatively low longitudinal spring rate as compared with the other portions of the unit. The center of this flexure is functionally relatable to that place just mentioned where separation would be measured if the tangent devices were nonunitary. In the case of this second modification, bending occurs in one or both of the portions of the unit extending away from the flexure, which bending is directly relatable to the load that produces it. A third modification discussed comprises nonunitary devices that contact each other.

The reasons why apparatus such as that just generally outlined will function to provide accurate loading information on a cantilever beam, independently of the point of load application, will be developed more fully below. It will also become apparent how the proposed apparatus is relatively simple in construction, and may readily be incorporated in a wide variety of appications.

These and other objects and advantages which are attained by the invention will become more fully apparent as the description which now follows is read in conjunction with the accompanying drawings.

DESCRIPTION OF THE DRAWINGS

FIG. 1 is a simplified side elevation illustrating one modification of the present invention attached for use in conjunction with a cantilever-type beam.

FIG. 2 is similar to FIG. 1, but shows the beam of FIG. 1 in a bent condition as the result of the application of a load to the beam's outer free end.

FIG. 3 is a view, on a somewhat larger scale than FIGS. 1 and 2, illustrating another modification of the invention.

FIG. 4 is a circuit diagram showing circuitry which may be used in conjunction with the modification shown in FIG. 3.

FIGS. 5 and 6 show still further modifications of the invention.

And, FIG. 7 is a circuit diagram showing circuitry usable with the modification of FIG. 6.

DETAILED DESCRIPTION OF THE INVENTION

Turning now to the drawings, and referring first to FIGS. 1 and 2, a simple elongated cantilever beam, having a substantially uniform square cross section, is indicated generally at 10 — this beam having an inner fixed end 10a secured to some suitable structure, such as that shown at 12, and an outer free end 10b. Although it makes no difference what the orientation of the beam is, it will be assumed herein that beam 10 extends horizontally. Along its length, the beam has a uniform modulus of elasticity (E), as well as uniform moment of inertia (I). Naturally, the exact modulus of elasticity will depend upon the material used in the beam, such modulus being one which is readily known for any selected material. Also, anyone skilled in the art will readily be able to calculate the moment of inertia for a beam of known uniform cross-sectional configuration. Beam 10 herein has an overall length indicated at L. The neutral axis of beam 10 (i.e., that longitudinal axis through the beam along which no tension or compression develops with bending of the beam) is shown at 14.

Beam 10 is adpated to receive downward vertical loading which will produce slight downward bending of the beam. In other words, this loading will take place downwardly in FIG. 1, and substantially in the same plane as this figure. It is contemplated that the load will be applied at substantially a right angle to the beam's neutral axis. In FIG. 1, such a load, which has not yet been applied to the beam, is indicated by the arrow marked W. In FIG. 2, it is assumed that this load has been applied, with the result that the beam is shown bent downwardly in FIG. 2. The actual bending shown in FIG. 2 is a great exaggeration of the slight bending which would be expected under normal loading circumstances, and is simply for illustrative purposes herein.

Indicated generally at 16 in FIGS. 1 and 2 is one simple form of apparatus, as contemplated herein, for measuring the amount of such a load applied in a vertical plane to beam 10. Apparatus 16 includes a pair of elongated, straight, slender bars, referred to as tangent devices, 18 20 — device 18 having a fixed end (its left end in the figures) suitably anchored to the near side of beam 10 at 22, and bar 20 having a fixed end (its right end in the figures) similarly anchored to the same side of the beam at 24. Such fixed ends constitute mounting means for the bars. As can be seen, anchor points 22, 24 are relatively widely separated along the length of the beam — point 22 being a relatively short distance (a) from the fixed end of the beam, and point 24 being a greater distance (b) from the same end of the beam. Bars 18, 20 project toward each other from their respective mounting points, and longitudinally overlap one another. As will be explained, these bars are positioned for movement in a slightly laterally offset from the plane vertical plane in which it is contemplated that beam 10 will be loaded. The latter plane is also referred to herein as a selected plane. Such overlapping is accommodated by lateral offsetting of the bars (in a direction normal to the plane of FIGS. 1 and 2) — bar 20 being closer to the viewer than bar 18. Bars 18, 20 herein are also referred to as inner and outer tangent devices, respectively. The free ends of bars 18, 20 are indicated at 18a, 20a, respectively.

The bars are so mounted that they each initially parallel neutral axis 14 — which anchor points 22, 24, lying in a common horizontal plane which also contains this axis. This condition is clearly illustrated in FIG. 1. With these bars securely anchored to the beam as indicated, then, it will be obvious that with bending of the beam, such as is shown in FIG. 2, each bar remains parallel to a line which is tangent to axis 14 at a point therealong adjacent the point of attachment of the bar. In the case of each bar, this point exists where a line normal to the plane of FIGS. 1 and 2, and passing through the bar's point of attachment, intersects axis 14. As can be seen in FIG. 2, with the beam in a bent condition, bars 18, 20 remain straight, and as these bars are seen in FIG. 2, they appear to be tangent to axis 14 at points directly underlying anchor points 22, 24 on the neutral axis.

Shown at 26, 28 in FIGS. 1 and 2 are indicia, such as apertures, in bars 18, 20, respectively. These apertures are immediately adjacent one another, and as viewed in FIG. 1, lie along a common line which is normal to the plane of the figure, and which is midway between points 22, 24. Apertures 26, 28 are referred to herein as marker portions. Because of the longitudinal overlapping which exists between the bars, only aperture 28 is visible in FIG. 1. However, it will be seen that both of these apertures are visible in FIG. 2.

Mounted on the near side of beam 10, centrally between points 22, 24, and behind bars 18, 20, is a distance scale, or monitoring means, 30. This scale is provided with suitable distance markings that are visible through apertures 26, 28.

With a beam such as beam 10, which has a uniform moment of inertia along that portion of it which extends between points 22, 24, what is known as the "moment rejection point" along axis 14 between points 22, 24 lies midway between them. In other words, it lies on axis 14 along the same common line (mentioned above) which contains apertures 26, 28 in FIG. 1. A moment rejection point herein is defined as being that point along the neutral axis of beam 10, between points, such as points 22, 24, at which a moment, or a couple, applied to the beam no further inwardly than point 24 would produce no tendency of apertures 26, 28 to separate, were such apertures located at immediately adjacent opposite sides of this point. The performance of bars 18, 20 under such a circumstance illustrates this concept. More particularly, with a couple so applied to the beam tending to cause beam bending in a vertical plane, apertures 26, 28 will remain axially aligned with each other, and will not separate in that plane. Application of such a couple is illustrated by the two, opposed, offset arrows designated C in FIG. 1, and is to be distinguished from application of a vertical load, such as load W.

In the case of a beam wherein the stretch extending between mounting points, such as points 22, 24, is not uniform, the moment rejection point may not lie midway between these points. Determination of the location of this point may be accomplished by conventional calculation well known to those skilled in the art. It may also be determined empirically.

It is important in employing the concept of the instant invention that the indicia, such as apertures 26, 28, in bars like bars 18, 20, be located at, or laterally aligned with, a beam's moment rejection point. It is this significant arrangement which permits the measuring of a vertical load on the beam without knowledge of the exact point of load application.

Considering the operation of the arrangement shown in FIGS. 1 and 2, when a vertical load, such as load W, is applied downwardly to beam 10, the beam bends, and a separation develops between apertures 26, 28. This separation is illustrated in FIG. 2, and is designated $\Delta$. As will be shown mathematically below, so long as such a load is applied no further inwardly on the beam than point 24, the amount of separation which develops between the apertures, and which, of course, is directly readable on scale 30, is directly proportional to the amount of the load. It makes no difference where along the beam, outwardly of point 24, the load is applied. Hence, it is possible to interpret the distance reading developed on the scale 30 as a direct indication of the amount of load.

The following mathematical equations show this to be the case:

Where:
  E is the modulus of elasticity of the beam material;
  I is the average moment of inertia of the beam between points 22, 24;
  $a, b, c, L$ are the designated distances along the beam; and
  $d^2y/dx^2$ is the first derivative of the slope of the beam at distance c therealong.

The bending moment at distance c is:

$$W(L-c) = EI\, d^2y/dx^2$$

Hence:
$$d^2y/dx^2 = W(L-c)/EI$$

Twice integrating:
$$dy/dx = W(2Lc-c^2)/2EI$$

$$y = Wc^2(3L-c)/6EI$$

Aperture 26 deflects vertically $Y_{ac}$:
$$Y_{ac} = Wa[(2a-3L)a + 3(2L-b)c]/6 \, EI$$

Aperture 28 deflects vertically $Y_{bc}$:
$$Y_{bc} = Wb[(2b-3L)b + 3(2L-b)c]/6 \, EI$$

The difference between $Y_{ac}$ and $Y_{bc}$ is $\Delta$:

$$\Delta = W(b-a)^3/12 \, EI$$

Hence:
$$W = 12 \, EI \, \Delta/(b-a)^3$$

Thus it can be seen that the amount of load W may be determined independably of distance L, simply by measuring $\Delta$, namely the distance which develops between apertures 26, 28.

Thus the apparatus shown in FIGS. 1 and 2 provides a very simple, reliable and accurate means for determining the load on a cantilever beam. It will be obvious that the exact structures of bars 18, 20 may be varied to suit different applications. Further, it will be obvious that means other than a scale may be used for visually determining a distance which develops between points such as apertures 26, 28. For example, such a separation could be viewed through some sort of an optical system, wherein a scale is provided that is relatable directly to applied load. Other means may, of course, be used.

Turning now to the modifications shown in FIGS. 3 and 6, these two modifications take into account the fact that, had in FIGS. 1 and 2 bars 18, 20 been interconnected in some fashion so as to work as a unit, and had this interconnection occurred at the same location as apertures 26, 28, then vertical loading of the beam as indicated tends both to produce bending in the bars, and tensing or compressing of the material portion interconnecting the bars. Such bending, and such tensing or compressing, are also directly proportional to the load on the beam. In FIGS. 3 and 6, two different modifications are shown of apparatus working on these two interrelated principles.

Considering first what is shown in FIG. 3, indicated at 32 is an elongated beam having a generally square cross section, except in a central portion along the beam in which there is formed a laterally centered, elongated slot 34. The inner and outer ends of this slot are indicated at 34a, 34b, respectivwely. Extending centrally and longitudinally into the beam from the left end of slot 34 is a bore 36. A similar bore 38 extends into the beam from end 34b. The outer end of bore 38 is closed off by a plug 40. Bores 36, 38 are of substantially the same diameter, and are axially aligned along the neutral axis of the beam.

Like previously mentioned beam 10, beam 32 has its left end of FIG. 3 affixed to an external structure 33.

Mounted as by cementing within bores 36, 38, are the end portions 42a, 42b, respectively, of an elongated deflection sensor 42. The construction and operation of a sensor like sensor 42 are fully described in my prior U.S. Pat. No. 3,832,898, issued Sept. 3, 1974 for DUAL-MOUNT ELECTROMECHANICAL DEFLECTION SENSOR. In general terms, sensor 42 includes an elongated body 44 including a conical portion 44a which merges with a cylindrical portion 44b opposite sides of which are flattened in a merging portion 44c. Formed in portion 44c are two spaced slots 46, 48 which define a "flexure" on the body. The sloping sides of conical portion 44a project (as indicated by the dashed lines) toward a point 50 which is located in the portion of the body disposed centrally between slots 46, 48.

Mounted on the upper and lower sides of conical portion 44a, through ceramic bonding deposits 52, are two elongated piezoresistive elements 54, 56. These two elements are disposed with their longitudinal axes contained in the plane of FIG. 3, which is the same plane containing neutral axis 35.

Considering FIG. 4 along with FIG. 2, this shows a circuit which is used herein in conjunction with elements 54, 56. It will be seen that these two elements are connected in series with each other, and together in parallel with the resistive winding 58a of a variable resistor 58. The wiper 58b in this resistor is connected to one side of a voltmeter 60, the other side of which connects with the junction between elements 54, 56. A battery 62 is connected across winding 58a.

With loading of beam 32 as indicated by W in FIG. 3, downward bending occurs in sensor 42, with the result that element 54 is placed in tension, and element 56 in compression. This results in imbalancing of the voltages applied to opposite sides of meter 60 in the circuit of FIG. 4 (assuming that wiper 58b was initially adjusted to balance these voltages) — such imbalance being directly proportional to the amount of deflection occurring in sensor 42. The reading thus produced in the meter is also directly proportional to the amount of load W. The only restriction in order for this to be true is that load W must be applied no further inwardly on the beam than the right end of slot 34 which corresponds to mounting point 24 in FIG. 1.

End portions 42a, 42b constitute mounting portions for sensor 42, and the other portions of the sensor which extend toward point 50 correspond to previously described bars or tangent devices 18, 20. Elements 54, 56, along with the other circuitry associated therewith shown in FIG. 4, constitute a monitoring means herein.

The cross sections of the two portions of beam 32 which straddle the opposite sides of slot 34 are the same, and are uniform along their lengths. Hence, the moment rejection point along the neutral axis of the beam, between slot ends 34a, 34b, is located exactly centrally between these ends. Point 50 is located exactly at this moment rejection point.

Considering the arrangement shown in FIG. 6, here there is provided a beam 64 which is substantially identical in construction to beam 32. Thus, beam 64 includes a substantially central slot 66 from the opposite ends of which extend axially aligned central bores 68, 70. The left end of beam 64 in FIG. 6 is suitably secured to an external structure shown at 72. Indicated generally at 74 is a unitary deflection sensor, including end portions 74a, 74b which are generally cylindrical, and which are centrally joined through what might be thought of as a flattened, sidewise tilted, generally S-shaped flexure portion 74c. The center of portion 74c is defined by a vertically extending web 74d, on the opposite sides of which are secured, as by ceramic deposits like those described earlier, two piezoresistive elements 76. Only one of these elements is visible in FIG. 6 — this being the one mounted on the near side of web 74d in the figure. Elements 76 lie in a common vertical plane which extends transversely of the neutral axis of beam 64, through the moment rejection point along this axis. As was true in the case of beam 32, the moment rejection point between the ends of slot 66 is located centrally between such ends. As can be seen, the outer ends of portions 74a, 74b in the deflection sensor are received within bores 68, 70. Cementing is used to secure the deflection sensor in place.

FIG. 7 shows a circuit which is used in conjunction with elements 76, both of which appear in this figure. These elements are connected in series, as shown, with variable resistor 78. Each series combination of piezoresistive element and a variable resistor is connected in parallel with the series combination of the other element and resistor. A voltmeter 80 interconnects the two junctions between the resistors and elements. It will be noted that the arrangement is such that elements 76 are on opposite sides of the bridge circuit thus formed. Such also is true with respect to the locations of the resistors 78. A battery 82 is connected across the circuit, as shown. The wipers in resistores 78 may be adjusted to balance the circuit so that meter 80 registers, normally, no voltage across it.

With downward loading of beam 64, as indicated by W in FIG. 6, tension develops in web 74d, and hence in elements 76. The amount of tension produced in these elements is directly proportional to the amount of load. Again, there is the limitation that load W must not be applied any further inwardly along the beam than the right end of slot 66 in FIG. 6.

In the circuit of FIG. 7, such tensing of the piezoresistive elements produces proportional unbalancing of the circuit, and the development of a proportional voltage which is indicated by meter 80.

Considering now one final modification of the invention which is illustrated herein, this is shown in FIG. 5. Here there is provided a beam 84 which is substantially the same in construction as previously described beams 32, 64. In order to simplify matters, further details of the beam are not specifically described. Indicated at 86, 88 are two generally cylindrical elongated bars, the left and right ends of which, respectively, are secured as by cementing in the axially aligned bores which open to the central slot in the beam. Bars 86, 88 include vertically displaced longitudinally overlapping portions 86a, 88a, the latter extending over the former. Portion 86a is provided with an upwardly disposed flat face 90 which faces a confronting flattened face 92 on portion 88a. A button 94 is joined to face 92, and contacts face 90. The point of contact between button 94 and face 90 is at the moment rejection point along the neutral axis of beam 84 between the ends of the slot in the beam. As was true in the cases of beams 32, 64, and with respect to the opposite ends of the slots in those beams, this point in beam 84 is disposed centrally between the slot ends.

Mounted by ceramic deposits 96 on the upper and lower sides of bar 86 are two piezoresistive elements 98, 100. These two elements lie in a common vertical plane which contains the neutral axis of the beam.

A circuit (not specifically shown) connects with elements 98, 100, such circuit being substantially identical to that shown for elements 54, 56 in FIG. 4.

With downward loading of beam 84 as indicated by W, bar 88, through button 94, presses downwardly on bar 86. Any tendency of the bars to readjust longitudinally with respect to each other is accommodated by sliding of button 94 on face 90. Such action produces downward bending of bar 86, with resultant tension occurring in element 98, and compression in element 100. Such tension and compression are directly proportional to the amount of load on the beam, and produce a reading in a meter, like meter 60, which is also proportional to the amount of loading.

It will thus be evident that the invention proposes an extremely simple and accurate means for measuring the amount of loading in a cantilever beam, independently of the location of loading along the beam. It will also be evident that apparatus according to the invention may take a number of different forms which may readily be incorporated in a wide variety of devices, wherein loading of the type described is desired to be monitored. It is particularly advantageous that one need not know the point of load application, since when such apparatus is used, it is necessary carefully to control the point of load application if accurate results are to be obtained.

While one can image countless applications for the proposed apparatus, a typical use would be in the handle of a torque wrench for monitoring the amount of torque being applied to a nut or bolt.

Accordingly, while various modifications of the invention have been decribed herein, it is appreciated that variations and changes are possible without departing from the spirit of the invention.

What is claimed and desired to secure by letters patent is:

1. Apparatus for measuring the load applied in a selected plane to a cantilever-type beam, without regard to the exact point of load application to the beam, said apparatus comprising a pair of tangent devices, including an inner and an outer device, adapted to be mounted at spaced-apart points on the beam in said selected plane between the beam's inner fixed end and outer free end, said outer device being intended for positioning no further outwardly on the beam than the innermost point thereon contemplated for possible load application, each tangent device including an elongated part which, with the device in place on the beam, and under all conditions of bending of the beam in said selected plane, tend to extend in said plane parallel to a line which is tangent to the longitudinal axis of the beam at the point where the device is mounted, each of said elongated parts including a marker portion which is adjacent the marker portion in the other part, and means cooperating with said devices for enabling monitoring of the tendency for the spacing, as measured in said plane, to change between said marker portions.

2. The apparatus of claim 1, wherein said marker portions are located centrally along the beam between the mounting points for said tangent devices.

3. The apparatus of claim 1, wherein said tangent devices are disconnected from one another, and the load applied in said selected plane to said beam is determined from the equation $W = 12\ EI\ \Delta\ /(b-a)^3$, where "$W$" is the load, "$E$" is the modulus of elasticity of the beam material, "$I$" is the average moment of inertia of the beam portion located between the mounting points for the two tangent devices, "$\Delta$" is the space between the marker portions, "$b$" is the distance between the fixed end of the beam and the mounting point for the outermost tangent device, and "$a$" is the distance between the fixed end of the beam and the mounting point for the innermost tangent device.

4. Apparatus for measuring the load applied in a selected plane to a cantilever-type beam, without regard to the exact point of load application to the beam, said apparatus comprising a pair of adjacent marker portions, a pair of mounting means for said marker portions mounting the same in a plane paralleling said selected plane at a pair of points spaced along the beam, each mounting means, under all circumstances of bending of the beam in said selected plane, tending to maintain its associated marker portion along a line parallel to a tangent to the longitudinal axis of the beam at the point on the beam where the mounting means is located, and a spacing monitor cooperating with said marker portions for monitoring the tendency of the spacing therebetween as measured in said plane parallel to said selected plane to change, and for producing a response directly indicative of such tendency.

5. The apparatus of claim 4, wherein said marker portions are located centrally along the beam between the mounting points for said tangent devices.

6. The apparatus of claim 4, wherein said marker portions are disconnected from each other, and the load applied in said selected plane to said beam is determined from the equation $W = 12 EI \Delta/(b-a)^3$, where $W$ is the load, $E$ is the modulus of elasticity of the beam material, $I$ is the average moment of inertia of the beam portion located between the mounting points for the two tangent devices, $\Delta$ is the space between the marker portions, $b$ is the distance between the fixed end of the beam and the mounting point for the outermost tangent device, and $a$ is the distance between the fixed end of the beam and the mounting point for the innermost tangent device.

* * * * *

UNITED STATES PATENT AND TRADEMARK OFFICE
CERTIFICATE OF CORRECTION

PATENT NO. : 3,992,933
DATED : November 23, 1976
INVENTOR(S) : George J. Randolph, Jr.

It is certified that error appears in the above-identified patent and that said Letters Patent are hereby corrected as shown below:

In the claims:

Claim 4, last line add the word --a-- before the word "tendency".

Claim 6, line 8 put " around W and E; line 9 put " around I; line 11 put " around $\Delta$ ; line 12 put " around b; and line 15 put " around a Signed and Sealed this Eighth Day of March 1977

[SEAL]

Attest:

RUTH C. MASON
*Attesting Officer*

C. MARSHALL DANN
*Commissioner of Patents and Trademarks*